US012700527B2

(12) United States Patent
Wu et al.

(10) Patent No.: US 12,700,527 B2
(45) Date of Patent: Aug. 4, 2026

(54) UNDERCOOLING SOLIDIFICATION METHOD FOR PREPARING AMORPHOUS OR NANOCRYSTALLINE SOFT MAGNETIC ALLOY WITH HIGH FE CONTENT

(71) Applicant: Zhejiang University, Hangzhou (CN)

(72) Inventors: Chen Wu, Hangzhou (CN); Kebing Wang, Hangzhou (CN); Xinyang Zhang, Hangzhou (CN); Mi Yan, Hangzhou (CN); Jiaying Jin, Hangzhou (CN)

(73) Assignee: Zhejiang University, Hangzhou City (CN)

( * ) Notice: Subject to any disclaimer, the term of this patent is extended or adjusted under 35 U.S.C. 154(b) by 485 days.

(21) Appl. No.: 18/446,488

(22) Filed: Aug. 9, 2023

(65) Prior Publication Data

US 2024/0312681 A1 Sep. 19, 2024

(30) Foreign Application Priority Data

Mar. 16, 2023 (CN) ........................ 202310255467.X

(51) Int. Cl.

| | |
|---|---|
| ***H01F 1/153*** | (2006.01) |
| ***B22F 1/08*** | (2022.01) |
| ***B22F 1/142*** | (2022.01) |
| ***B22F 9/00*** | (2006.01) |
| ***B22F 9/08*** | (2006.01) |
| ***C21D 6/00*** | (2006.01) |
| ***C21D 9/52*** | (2006.01) |
| ***C22C 33/04*** | (2006.01) |
| ***C22C 38/00*** | (2006.01) |
| ***C22C 38/02*** | (2006.01) |
| ***C22C 38/12*** | (2006.01) |
| ***C22C 38/14*** | (2006.01) |
| ***C22C 38/16*** | (2006.01) |
| ***C22C 45/00*** | (2023.01) |

(52) U.S. Cl.

CPC ............ *H01F 1/15341* (2013.01); *B22F 1/08* (2022.01); *B22F 1/142* (2022.01); *B22F 9/007* (2013.01); *B22F 9/008* (2013.01); *B22F 9/082* (2013.01); *C21D 6/008* (2013.01); *C21D 9/52* (2013.01); *C22C 33/04* (2013.01); *C22C 38/002* (2013.01); *C22C 38/004* (2013.01); *C22C 38/005* (2013.01); *C22C 38/02* (2013.01); *C22C 38/12* (2013.01); *C22C 38/14* (2013.01); *C22C 38/16* (2013.01); *C22C 45/008* (2013.01); *H01F 1/15333* (2013.01); *B22F 2301/35* (2013.01); *B22F 2998/10* (2013.01); *B22F 2999/00* (2013.01); *C22C 2200/02* (2013.01); *C22C 2200/04* (2013.01); *C22C 2202/02* (2013.01)

(58) Field of Classification Search

None

See application file for complete search history.

(56) References Cited

FOREIGN PATENT DOCUMENTS

| | | | | |
|---|---|---|---|---|
| CN | 104934179 A | * | 9/2015 | |
| CN | 107103976 A | * | 8/2017 | ......... H01F 1/15316 |
| CN | 108611542 A | * | 10/2018 | ............. B22D 27/04 |
| CN | 114381668 A | * | 4/2022 | ............. C22C 38/14 |

OTHER PUBLICATIONS

Soft magnetic materials (Year: 2016).*

Dynamic Analysis of Recalescence Process and Interface Growth of Eutectic Fe82B17Si1 Alloy Journal of Materials Engineering and Performance (Year: 2018).*

* cited by examiner

*Primary Examiner* — Jenny R Wu

(57) ABSTRACT

The present invention provides an undercooling solidification method for preparing an amorphous or nanocrystalline soft magnetic alloy with high Fe content and the applicable amorphous or nanocrystalline alloy composition. The undercooling solidification is realized by glass purification combined with cyclical superheating or electromagnetic levitation melting. An undercooling solidification alloy is prepared into amorphous strips or powders through rapid quenching or atomization of melt, and can be prepared into a nanocrystalline alloy through heat treatment. The chemical formula of the applicable amorphous or nanocrystalline alloy is FeSiBM, wherein M is one or more of P, C, Nb, Mo, Zr, Hf, Mo, Y, Cu and Co. The amorphous or nanocrystalline alloy prepared by undercooling non-equilibrium solidification has the characteristics of high amorphous forming ability, high saturation magnetization and low coercive force.

5 Claims, No Drawings

UNDERCOOLING SOLIDIFICATION METHOD FOR PREPARING AMORPHOUS OR NANOCRYSTALLINE SOFT MAGNETIC ALLOY WITH HIGH FE CONTENT

CROSS-REFERENCE TO RELATED APPLICATIONS

This application claims priority of Chinese Patent Application No. 202310255467.X, filed on Mar. 16, 2023, the entire contents of which are incorporated herein by reference.

TECHNICAL FIELD

The present invention relates to a method for preparing an amorphous or nanocrystalline soft magnetic alloy with high Fe content through undercooling solidification, and belongs to the field of metallic soft magnetic materials.

BACKGROUND

Compared with the crystalline soft magnetic alloy, the Fe-based amorphous or nanocrystalline soft magnetic alloy exhibits obvious advantages of low coercive force and high resistivity due to the special microstructure. However, due to the presence of considerable proportion of elements promoting amorphous formation in the Fe-based amorphous or nanocrystalline alloy, the saturation magnetization is reduced, which limits the development of high power and miniaturization of the related soft magnetic devices. The saturation magnetization of the classical amorphous soft magnetic alloy (with the international designation of Metglas 2605SA1 and the Chinese designation of 1K101) is about 1.55 T, while the saturation magnetization of the classical nanocrystalline soft magnetic alloy (with the international designation of Finemet and the Chinese designation of 1K107) is about 1.24 T, both of which are much lower than that of silicon steel (about 2.12 T).

In order to give full play to the application potential of the amorphous or nanocrystalline soft magnetic alloy in various power electronic devices, it is urgent to increase the content of Fe-dominated magnetic elements and the saturation magnetization in the Fe-based amorphous or nanocrystalline alloy. The challenge for preparing an amorphous or nanocrystalline soft magnetic alloy with high Fe content lies in that the requirement for obtaining an amorphous matrix is very strict and the cooling rate of the molten alloy needs to reach more than about $10^{5}$° C./s. According to the Inoue's three empirical rules for amorphous system design, it is often necessary to add about 20 at % of non-magnetic elements in the alloy to promote the formation of amorphous structures. The nanocrystalline soft magnetic alloy is prepared from an amorphous alloy through crystallization annealing, and it is also often necessary to add non-magnetic elements that nucleate and inhibit grain growth. The introduction of these elements greatly limits the content of ferromagnetic elements in the amorphous or nanocrystalline soft magnetic alloy, so it is difficult to achieve high saturation magnetization.

At present, the methods to improve the saturation magnetization of the Fe-based amorphous or nanocrystalline soft magnetic alloy mainly focus on composition control. The first route is to enhance the ferromagnetic exchange strength in the alloy by adding the Co element to improve the saturation magnetization, for example, the patent ZL201410728540.1 discloses a $Fe_aCo_bNb_cB_dCu_e$ alloy, which improves the saturation magnetization of the nanocrystalline alloy to 1.80 T by adding 6-20 at % of Co, and the coercive force is 10-35 A/m. The second route is to adjust the additive amount of metalloid elements such as Si, B, C and P, for example, the patent ZL200510066862.5 discloses a $Fe_aSi_bB_cC_d$ alloy, and when c=12-18 at % and $b \leq (0.5 \times a-36) \times d^{1/3}$, the saturation magnetization of the Fe-based amorphous strips can reach more than 1.60 T. In addition, ZL201410285976.8 discloses a $Fe_aSi_bB_cC_dP_e$ alloy, and the obtained $Fe_{84.3}Si_{2.3}B_{9.7}C_{0.9}P_{2.8}$ alloy has the highest saturation magnetization of 1.69 T by adjusting the additive proportion of metalloid elements. On one hand, such method can adjust the additive proportion of metalloid elements to affect the difference of mixing enthalpy and atomic size of the alloy according to the Inoue's three empirical rules, so as to improve the amorphous forming ability of the alloy and thus increase the content of ferromagnetic elements; on the other hand, the 2p electrons of metalloid elements can affect the 3d electrons of Fe and affect the atomic magnetic moment of Fe, thus regulating the saturation magnetization of the alloy. It can be known from the above patents that the method of adjusting the content of metalloid elements needs to accurately control the proportional relationship of different elements, and the increase of the additive amount of ferromagnetic elements is still limited, which limits the further improvement of the saturation magnetization.

This patent realizes undercooling solidification of the Fe-based amorphous or nanocrystalline alloy through glass purification combined with cyclical superheating or electromagnetic levitation melting, reduces the additive amount of non-magnetic elements in the alloy and can effectively increase the additive amount of ferromagnetic elements in the alloy to increase the saturation magnetization and maintain low coercive force of the alloy.

SUMMARY

The purpose of the present invention is to overcome the shortcomings of the existing preparation technology for Fe-based amorphous or nanocrystalline soft magnetic alloys, to reduce the additive amount of elements promoting amorphous formation in the alloy by undercooling non-equilibrium solidification, and to realize the preparation of the amorphous or nanocrystalline soft magnetic alloy with high Fe content, thereby broadening the composition design range of the Fe-based amorphous or nanocrystalline soft magnetic alloy and improving the saturation magnetization of the alloy.

The present invention is realized by the following technical solution:

An undercooling solidification method for preparing amorphous or nanocrystalline soft magnetic alloy with high Fe content, which makes the alloy undercooled and solidified by means of glass fluxing combined with cyclical superheating or electromagnetic levitation melting, reducing the additive amount of elements promoting amorphous formation in the Fe-based amorphous or nanocrystalline soft magnetic alloy, increasing the proportion of the Fe element and achieving the goals of enhancing saturation magnetization and reducing coercive force.

Preferably, the method of glass fluxing combined with cyclical superheating comprises the following steps:

Step 1: the chemical formula of the amorphous or nanocrystalline alloy is FeSiBM, wherein M is one or more of P, C, Nb, Mo, Zr, Hf, Mo, Y, Cu and Co. Removing the surface oxidation layers of raw materials of the alloy, cleaning the raw materials, and weighing the raw materials according to a certain mass ratio. Vacuumizing the weighed raw materials in a vacuum induction melting furnace or vacuum arc melting furnace to at least $10^{-3}$ Pa, filling inert gas for protection, then melting the raw materials, and repeating melting for 4-6 times to obtain an alloy ingot;

Step 2: putting the alloy ingot into a crucible, and covering the upper and lower surfaces with a glass purifying agent with a certain mass ratio so that the glass purifying agent completely covers the alloy ingot;

Step 3: after vacuumizing to at least $10^{-2}$ Pa, filling inert gas for protection, heating the alloy to the molten state, then heating up to 1200-1500° C., preserving heat for 1-10 min, and turning off the heating electric power to make the alloy naturally cool;

Step 4: implementing a cycle process of "heating-heat preservation-solidification" for 3-6 times so that the alloy achieves the required degree of undercooling;

Step 5: solidifying the undercooled and solidified alloy into strips or powders through rapid quenching or atomization of melt;

Step 6: for the obtained strips or powders, carrying out stress-relief annealing to obtain a Fe-based amorphous alloy or carrying out crystallization annealing to obtain a Fe-based nanocrystalline alloy.

Preferably, the inert gas is argon or nitrogen with the purity of not less than 99.9 vol %.

Preferably, the heat-resistance temperature of the crucible is not lower than 1400° C.

Preferably, the method for preparing an amorphous or nanocrystalline soft magnetic alloy with high Fe content through glass fluxing combined with cyclical superheating is characterized in that the process for preparing the glass purifying agent comprises: weighing and placing powdered $Na_2B_4O_7$ and $B_2O_3$ with the purity of not less than 98% in a high purity corundum crucible respectively, firing at 400-600° C. for 1-8 h, and then melting and firing at 800-1000° C. for 2-16 h. Mixing the fired $Na_2B_4O_7$ and $B_2O_3$ to obtain the purifying agent, wherein the mass ratio of $Na_2B_4O_7$ to $B_2O_3$ is 1:1-20.

Preferably, the mass ratio of the glass purifying agent to the alloy ingot is 1:1-5.

Preferably, the method of electromagnetic levitation melting comprises the following steps:

Step 1: the chemical formula of the amorphous or nanocrystalline alloy is FeSiBM, wherein M is one or more of P, C, Nb, Mo, Zr, Hf, Mo, Y, Cu and Co. Removing the surface oxidation layers of raw materials of the alloy, cleaning the raw materials, and weighing the raw materials according to a certain mass ratio. Vacuumizing the weighed raw materials in a vacuum induction melting furnace or vacuum arc melting furnace to at least $10^{-3}$ Pa, filling inert gas for protection, then melting the raw materials, and repeating melting for 4-6 times to obtain an alloy ingot;

Step 2: after vacuumizing to at least $10^{-3}$ Pa, filling inert gas for protection, placing the alloy ingot below a suspended coil, and stably suspending the parent alloy in the center of a heating coil by the Lorentz force formed by the interaction between the electromagnetic field and the induced current;

Step 3: heating the alloy by induction of the heating coil to the molten state, then heating up to 1200-1500° C., preserving heat for 1-10 min, and then turning off the heating electric power to make the alloy naturally cool;

Step 4: implementing a cycle process of "heating-heat preservation-solidification" for 3-6 times so that the alloy achieves the required degree of undercooling;

Step 5: solidifying the undercooled and solidified alloy into strips or powders through rapid quenching or atomization of melt;

Step 6: for the obtained strips or powders, carrying out stress-relief annealing to obtain a Fe-based amorphous alloy or carrying out crystallization annealing to obtain a Fe-based nanocrystalline alloy.

Preferably, the chemical formula of the amorphous or nanocrystalline soft magnetic alloy with high Fe content is FeSiBM, wherein M is one or more of P, C, Nb, Mo, Zr, Hf, Mo, Y, Cu and Co, the total atomic percent of alloy elements is 100%, and the content of each element is as follows: Fe is 80.0-89.0 at %, Si is 1.0-9.0 at %, B is 3.0-12.0 at %, P is 0-5.0 at %, C is 0-5.0 at %, Nb is 0-3.0 at %, Zr is 0-3.0 at %, Hf is 0-3.0 at %, Mo is 0-3.0 at %, Y is 0-5.0 at %, Cu is 0-2.0 at % and Co is 0-16.0 at %.

Preferably, the inert gas is argon or nitrogen with the purity of not less than 99.9 vol %.

Preferably, the amorphous alloy is annealed within a temperature range of 50-100° C. below the crystallization temperature, and the nanocrystalline alloy is annealed within a temperature range of 0-100° C. above the crystallization temperature.

Preferably, the annealing is carried out in an inert gas atmosphere or in an environment with the vacuum degree of better than $10^{-1}$ Pa.

The amorphous or nanocrystalline soft magnetic alloy prepared by non-equilibrium solidification exhibits high amorphous forming ability, which is conducive to reducing the additive amount of elements promoting amorphous formation in the alloy and increasing the content of the ferromagnetic element Fe. The amorphous or nanocrystalline alloy with high Fe content prepared by the method has the soft magnetic characteristics of high saturation magnetization and low coercive force.

DETAILED DESCRIPTION

Embodiments of the present invention are described in detail below. An amorphous or nanocrystalline soft magnetic alloy with high Fe content, which has high saturation magnetization, is obtained by adjusting the alloy composition and the degree of undercooling.

Embodiment 1

Preparing FeSiB Amorphous Alloy by Undercooling Solidification

A FeSiB system alloy is prepared, wherein in alloy 1, the Fe content is 83.0 at %, the Si content is 8.0 at %, and the B content is 9.0 at %; in alloy 2, the Fe content is 85.0 at %, the Si content is 7.0 at %, and the B content is 8.0 at %; and in alloy 3, the Fe content is 88.0 at %, the Si content is 3.0 at %, and the B content is 9.0 at %;

Step 1: removing the surface oxidation layers of raw materials of the alloy, cleaning the raw materials, and weighing the raw materials according to a certain mass ratio. Vacuumizing the weighed raw materials in a vacuum arc melting furnace to $8\times10^{-4}$ Pa, filling argon with the purity of 99.9 vol % for protection, then melting the raw materials, and repeating melting for 5 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:5 so that the glass purifying agent completely covers the alloy ingot;

Step 3: after vacuumizing to $5\times10^{-3}$ Pa, filling argon with the purity of 99.9 vol % for protection, heating the alloy to the molten state, then heating up to 1350° C., preserving heat for 2 min, and turning off the heating electric power to make the alloy naturally cool;

Step 4: implementing a cycle process of "heating-heat preservation-solidification" for 4 times and 6 times respectively so that the alloy achieves the degrees of undercooling of about 190° C. and 260° C.;

Step 5: solidifying the undercooled and solidified alloy into strips through rapid quenching of melt;

Step 6: carrying out stress-relief annealing of the obtained strips at 300° C. to obtain a Fe-based amorphous alloy;

The saturation magnetization and coercive force of the alloy at different degrees of undercooling are shown in the table below:

TABLE 1

Saturation Magnetization and Coercive Force of FeSiB Amorphous Alloy at Different Degrees of Undercooling

| Sample Number | Saturation Magnetization (T) | Coercive Force (A/m) |
|---|---|---|
| Alloy 1 (Not undercooled) | 1.66 | 2.5 |
| Alloy 1 (Undercooled at 190° C.) | 1.66 | 1.5 |
| Alloy 1 (Undercooled at 260° C.) | 1.67 | 1.2 |
| Alloy 2 (Not undercooled) | 1.69 | 250.7 |
| Alloy 2 (Undercooled at 190° C.) | 1.71 | 3.7 |
| Alloy 2 (Undercooled at 260° C.) | 1.72 | 1.7 |
| Alloy 3 (Not undercooled) | 1.70 | 312.5 |
| Alloy 3 (Undercooled at 190° C.) | 1.72 | 15.4 |
| Alloy 3 (Undercooled at 260° C.) | 1.73 | 3.1 |

Embodiment 2

Preparing FeSiBPC Amorphous Alloy by Undercooling Solidification

A FeSiBPC system alloy is prepared, wherein in alloy 1, the Fe content is 84.0 at %, the Si content is 2.0 at %, the B content is 8.0 at %, the P content is 5.0 at %, and the C content is 1.0 at %; in alloy 2, the Fe content is 84.0 at %, the Si content is 2.0 at %, the B content is 8.0 at %, the P content is 1.0 at %, and the C content is 5.0 at %; and in alloy 3, the Fe content is 89.0 at %, the Si content is 2.0 at %, the B content is 8.0 at %, the P content is 0.5 at %, and the C content is 0.5 at %;

Step 1: removing the surface oxidation layers of raw materials of the alloy, cleaning the raw materials, and weighing the raw materials according to a certain mass ratio. Vacuumizing the weighed raw materials in a vacuum arc melting furnace to $7\times10^{-4}$ Pa, filling nitrogen with the purity of 99.9 vol % for protection, then melting the raw materials, and repeating melting for 6 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:4 so that the glass purifying agent completely covers the alloy ingot;

Step 3: after vacuumizing to $4\times10^{-3}$ Pa, filling nitrogen with the purity of 99.9 vol % for protection, heating the alloy to the molten state, then heating up to 1400° C., preserving heat for 3 min, and turning off the heating electric power to make the alloy naturally cool;

Step 4: implementing a cycle process of "heating-heat preservation-solidification" for 4 times and 6 times respectively so that the alloy achieves the degrees of undercooling of about 160° C. and 255° C.;

Step 5: solidifying the undercooled and solidified alloy into strips through rapid quenching of melt;

Step 6: carrying out stress-relief annealing of the obtained strips at 300° C. to obtain a Fe-based amorphous alloy;

The saturation magnetization and coercive force of the alloy at different degrees of undercooling are shown in the table below:

TABLE 2

Saturation Magnetization and Coercive Force of FeSiBPC Amorphous Alloy at Different Degrees of Undercooling

| Sample Number | Saturation Magnetization (T) | Coercive Force (A/m) |
|---|---|---|
| Alloy 1 (Not undercooled) | 1.66 | 313.6 |
| Alloy 1 (Undercooled at 160° C.) | 1.72 | 24.5 |
| Alloy 1 (Undercooled at 255° C.) | 1.73 | 2.5 |
| Alloy 2 (Not undercooled) | 1.67 | 348.5 |
| Alloy 2 (Undercooled at 160° C.) | 1.73 | 27.7 |
| Alloy 2 (Undercooled at 255° C.) | 1.74 | 3.5 |
| Alloy 3 (Not undercooled) | 1.72 | 423.8 |
| Alloy 3 (Undercooled at 160° C.) | 1.78 | 17.5 |
| Alloy 3 (Undercooled at 255° C.) | 1.80 | 4.3 |

Embodiment 3

Preparing FeSiBC Amorphous Alloy by Undercooling Solidification

A FeSiBC system alloy is prepared, wherein in alloy 1, the Fe content is 84.0 at %, the Si content is 2.0 at %, the B content is 8.0 at %, and the C content is 6.0 at %; in alloy 2, the Fe content is 85.0 at %, the Si content is 2.0 at %, the B content is 8.0 at %, and the C content is 5.0 at %; and in alloy 3, the Fe content is 89.0 at %, the Si content is 2.0 at %, the B content is 8.0 at %, and the C content is 1.0 at %;

Step 1: removing the surface oxidation layers of raw materials of the alloy, cleaning the raw materials, and weighing the raw materials according to a certain mass ratio. Vacuumizing the weighed raw materials in a vacuum induction melting furnace or vacuum arc melting furnace to $8\times10^{-4}$ Pa, filling inert gas for protection, then melting the raw materials, and repeating melting for 6 times to obtain an alloy ingot;

Step 2: after vacuumizing to $4\times10^{-3}$ Pa, filling nitrogen with the purity of 99.9 vol % for protection, placing the alloy ingot below a suspended coil, and stably suspending the parent alloy in the center of a heating coil by the Lorentz force formed by the interaction between the electromagnetic field and the induced current;

Step 3: heating the alloy by induction of the heating coil to the molten state, then heating up to 1500° C., preserving heat for 5 min, and then turning off the heating electric power to make the alloy naturally cool;

Step 4: implementing a cycle process of "heating-heat preservation-solidification" for 3 times and 5 times respectively so that the alloy achieves the degrees of undercooling of about 150° C. and 225° C.;

Step 5: solidifying the undercooled and solidified alloy into strips through rapid quenching of melt;

Step 6: carrying out stress-relief annealing of the obtained strips at 300° C. to obtain a Fe-based amorphous alloy;

The saturation magnetization and coercive force of the alloy at different degrees of undercooling are shown in the table below:

TABLE 3

Saturation Magnetization and Coercive Force of FeSiBC Amorphous Alloy at Different Degrees of Undercooling

| Sample Number | Saturation Magnetization (T) | Coercive Force (A/m) |
|---|---|---|
| Alloy 1 (Not undercooled) | 1.68 | 363.6 |
| Alloy 1 (Undercooled at 150° C.) | 1.70 | 27.5 |
| Alloy 1 (Undercooled at 225° C.) | 1.71 | 3.1 |
| Alloy 2 (Not undercooled) | 1.71 | 368.5 |
| Alloy 2 (Undercooled at 150° C.) | 1.73 | 29.7 |
| Alloy 2 (Undercooled at 225° C.) | 1.74 | 3.8 |
| Alloy 3 (Not undercooled) | 1.72 | 427.8 |
| Alloy 3 (Undercooled at 150° C.) | 1.77 | 19.8 |
| Alloy 3 (Undercooled at 225° C.) | 1.79 | 5.3 |

Embodiment 4

Preparing FeSiBCu Nanocrystalline Alloy by Undercooling Solidification

A FeSiBCu system alloy is prepared, wherein in alloy 1, the Fe content is 80.5 at %, the Si content is 7.0 at %, the B content is 12.0 at %, and the Cu content is 0.5 at %; in alloy 2, the Fe content is 85.0 at %, the Si content is 2.5 at %, the B content is 12.0 at %, and the Cu content is 0.5 at %; and in alloy 3, the Fe content is 85.0 at %, the Si content is 1.2 at %, the B content is 12.0 at %, and the Cu content is 1.8 at %;

Step 1: removing the surface oxidation layers of raw materials of the alloy, cleaning the raw materials, and weighing the raw materials according to a certain mass ratio. Vacuumizing the weighed raw materials in a vacuum induction melting furnace to $9\times10^{-4}$ Pa, filling argon with the purity of 99.9 vol % for protection, then melting the raw materials, and repeating melting for 4 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:20 so that the glass purifying agent completely covers the alloy ingot;

Step 3: after vacuumizing to $5\times10^{-3}$ Pa, filling argon with the purity of 99.9 vol % for protection, heating the alloy to the molten state, then heating up to 1320° C., preserving heat for 5 min, and turning off the heating electric power to make the alloy naturally cool;

Step 4: implementing a cycle process of "heating-heat preservation-solidification" for 3 times and 4 times respectively so that the alloy achieves the degrees of undercooling of about 205° C. and 255° C.;

Step 5: solidifying the undercooled and solidified alloy into strips through rapid quenching of melt;

Step 6: carrying out crystallization annealing of the obtained strips at 450° C. to obtain a Fe-based nanocrystalline alloy;

The saturation magnetization and coercive force of the alloy at different degrees of undercooling are shown in the table below:

TABLE 4

Saturation Magnetization and Coercive Force of FeSiBCu Nanocrystalline Alloy at Different Degrees of Undercooling

| Sample Number | Saturation Magnetization (T) | Coercive Force (A/m) |
|---|---|---|
| Alloy 1 (Not undercooled) | 1.55 | 30.6 |
| Alloy 1 (Undercooled at 205° C.) | 1.59 | 7.8 |
| Alloy 1 (Undercooled at 255° C.) | 1.60 | 5.6 |
| Alloy 2 (Not undercooled) | 1.65 | 320.7 |
| Alloy 2 (Undercooled at 205° C.) | 1.72 | 6.5 |
| Alloy 2 (Undercooled at 255° C.) | 1.75 | 4.5 |
| Alloy 3 (Not undercooled) | 1.66 | 512.5 |
| Alloy 3 (Undercooled at 205° C.) | 1.75 | 13.4 |
| Alloy 3 (Undercooled at 255° C.) | 1.77 | 1.7 |

Embodiment 5

Preparing FeSiBNbCu Nanocrystalline Alloy by Undercooling Solidification

A FeSiBNbCu system alloy is prepared, wherein in alloy 1, the Fe content is 80.0 at %, the Si content is 7.0 at %, the B content is 9.0 at %, the Nb content is 3.0 at %, and the Cu content is 1.0 at %; in alloy 2, the Fe content is 82.0 at %, the Si content is 6.0 at %, the B content is 9.0 at %, the Nb content is 2.0 at %, and the Cu content is 1.0 at %; and in alloy 3, the Fe content is 85.0 at %, the Si content is 4.5 at %, the B content is 9.0 at %, the Nb content is 0.5 at %, and the Cu content is 1.0 at %;

Step 1: removing the surface oxidation layers of raw materials of the alloy, cleaning the raw materials, and weighing the raw materials according to a certain mass ratio. Vacuumizing the weighed raw materials in a vacuum arc melting furnace to $8\times10^{-4}$ Pa, filling argon with the purity of 99.9 vol % for protection, then melting the raw materials, and repeating melting for 6 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:10 so that the glass purifying agent completely covers the alloy ingot;

Step 3: after vacuumizing to $8\times10^{-3}$ Pa, filling nitrogen with the purity of 99.9 vol % for protection, heating the alloy to the molten state, then heating up to 1380° C., preserving heat for 1 min, and turning off the heating electric power to make the alloy naturally cool;

Step 4: implementing a cycle process of "heating-heat preservation-solidification" for 5 times and 6 times respectively so that the alloy achieves the degrees of undercooling of about 190° C. and 225° C.;

Step 5: solidifying the undercooled and solidified alloy into strips through rapid quenching of melt;

Step 6: carrying out crystallization annealing of the obtained strips at 550° C. to obtain a Fe-based nanocrystalline alloy;

The saturation magnetization and coercive force of the alloy at different degrees of undercooling are shown in the table below:

TABLE 5

Saturation Magnetization and Coercive Force of FeSiBNbCu Nanocrystalline Alloy at Different Degrees of Undercooling

| Sample Number | Saturation Magnetization (T) | Coercive Force (A/m) |
|---|---|---|
| Alloy 1 (Not undercooled) | 1.60 | 33.7 |
| Alloy 1 (Undercooled at 190° C.) | 1.62 | 4.6 |
| Alloy 1 (Undercooled at 225° C.) | 1.63 | 2.6 |
| Alloy 2 (Not undercooled) | 1.62 | 248.6 |
| Alloy 2 (Undercooled at 190° C.) | 1.66 | 4.8 |
| Alloy 2 (Undercooled at 225° C.) | 1.67 | 3.5 |
| Alloy 3 (Not undercooled) | 1.65 | 355.2 |
| Alloy 3 (Undercooled at 190° C.) | 1.71 | 5.1 |
| Alloy 3 (Undercooled at 225° C.) | 1.73 | 4.2 |

Embodiment 6

Preparing FeSiBMoCu Nanocrystalline Alloy by Undercooling Solidification

A FeSiBMoCu system alloy is prepared, wherein in alloy 1, the Fe content is 80.0 at %, the Si content is 7.0 at %, the B content is 9.0 at %, the Mo content is 3.0 at %, and the Cu content is 1.0 at %; in alloy 2, the Fe content is 82.0 at %, the Si content is 6.0 at %, the B content is 9.0 at %, the Mo content is 2.0 at %, and the Cu content is 1.0 at %; and in alloy 3, the Fe content is 83.3 at %, the Si content is 5.0 at %, the B content is 9.0 at %, the Mo content is 0.7 at %, and the Cu content is 1.0 at %;

Step 1: removing the surface oxidation layers of raw materials of the alloy, cleaning the raw materials, and weighing the raw materials according to a certain mass ratio. Vacuumizing the weighed raw materials in a vacuum induction melting furnace to 8×10−4 Pa, filling argon with the purity of 99.9 vol % for protection, then melting the raw materials, and repeating melting for 4 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:1 so that the glass purifying agent completely covers the alloy ingot;

Step 3: after vacuumizing to $1\times10^{-2}$ Pa, filling argon with the purity of 99.9 vol % for protection, heating the alloy to the molten state, then heating up to 1370° C., preserving heat for 6 min, and turning off the heating electric power to make the alloy naturally cool;

Step 4: implementing a cycle process of "heating-heat preservation-solidification" for 3 times and 5 times respectively so that the alloy achieves the degrees of undercooling of about 175° C. and 255° C.;

Step 5: solidifying the undercooled and solidified alloy into strips through rapid quenching of melt;

Step 6: carrying out crystallization annealing of the obtained strips at 500° C. to obtain a Fe-based nanocrystalline alloy;

The saturation magnetization and coercive force of the alloy at different degrees of undercooling are shown in the table below:

TABLE 6

Saturation Magnetization and Coercive Force of FeSiBMoCu Nanocrystalline Alloy at Different Degrees of Undercooling

| Sample Number | Saturation Magnetization (T) | Coercive Force (A/m) |
|---|---|---|
| Alloy 1 (Not undercooled) | 1.56 | 35.8 |
| Alloy 1 (Undercooled at 175° C.) | 1.57 | 4.7 |
| Alloy 1 (Undercooled at 255° C.) | 1.58 | 2.6 |
| Alloy 2 (Not undercooled) | 1.65 | 261.7 |
| Alloy 2 (Undercooled at 175° C.) | 1.68 | 5.1 |
| Alloy 2 (Undercooled at 255° C.) | 1.69 | 3.8 |
| Alloy 3 (Not undercooled) | 1.71 | 325.7 |
| Alloy 3 (Undercooled at 175° C.) | 1.75 | 12.3 |
| Alloy 3 (Undercooled at 255° C.) | 1.76 | 6.8 |

Embodiment 7

Preparing FeCoSiBCCu Nanocrystalline Alloy by Undercooling Solidification

A FeCoSiBCCu system alloy is prepared, wherein in alloy 1, the Fe content is 80.0 at %, the Co content is 5.0 at %, the Si content is 1.5 at %, the B content is 9.0 at %, the C content is 3.0 at %, and the Cu content is 1.5 at %; in alloy 2, the Fe content is 75.0 at %, the Co content is 10.0 at %, the Si content is 1.5 at %, the B content is 9.0 at %, the C content is 3.0 at %, and the Cu content is 1.5 at %; and in alloy 3, the Fe content is 70.0 at %, the Co content is 15.0 at %, the Si content is 1.5 at %, the B content is 9.0 at %, the C content is 3.0 at %, and the Cu content is 1.5 at %;

Step 1: removing the surface oxidation layers of raw materials of the alloy, cleaning the raw materials, and weighing the raw materials according to a certain mass ratio. Vacuumizing the weighed raw materials in a vacuum arc melting furnace to $8\times10^{-4}$ Pa, filling argon with the purity of 99.9 vol % for protection, then melting the raw materials, and repeating melting for 5 times to obtain an alloy ingot;

Step 2: putting the alloy ingot into a crucible, and covering the upper and lower surfaces with a glass purifying agent formed by mixing $Na_2B_4O_7$ and $B_2O_3$ at a mass ratio of 1:3 so that the glass purifying agent completely covers the alloy ingot;

Step 3: after vacuumizing to $8\times10^{-3}$ Pa, filling nitrogen with the purity of 99.9 vol % for protection, heating the alloy to the molten state, then heating up to 1350° C., preserving heat for 8 min, and turning off the heating electric power to make the alloy naturally cool;

Step 4: implementing a cycle process of "heating-heat preservation-solidification" for 3 times and 6 times respectively so that the alloy achieves the degrees of undercooling of about 150° C. and 265° C.;

Step 5: solidifying the undercooled and solidified alloy into strips through rapid quenching of melt;

Step 6: carrying out crystallization annealing of the obtained strips at 400° C. to obtain a Fe-based nanocrystalline alloy;

The saturation magnetization and coercive force of the alloy at different degrees of undercooling are shown in the table below:

TABLE 7

Saturation Magnetization and Coercive Force of FeCoSiBCCu Nanocrystalline Alloy at Different Degrees of Undercooling

| Sample Number | Saturation Magnetization (T) | Coercive Force (A/m) |
|---|---|---|
| Alloy 1 (Not undercooled) | 1.68 | 285.6 |
| Alloy 1 (Undercooled at 150° C.) | 1.78 | 6.5 |
| Alloy 1 (Undercooled at 265° C.) | 1.79 | 3.8 |
| Alloy 2 (Not undercooled) | 1.70 | 302.5 |
| Alloy 2 (Undercooled at 150° C.) | 1.80 | 7.1 |
| Alloy 2 (Undercooled at 265° C.) | 1.81 | 5.9 |
| Alloy 3 (Not undercooled) | 1.71 | 328.3 |
| Alloy 3 (Undercooled at 150° C.) | 1.81 | 7.8 |
| Alloy 3 (Undercooled at 265° C.) | 1.83 | 6.4 |

Embodiment 8

Preparing FeSiBZrHfCu Nanocrystalline Alloy by Undercooling Solidification

A FeSiBZrHfCu system alloy is prepared, wherein in alloy 1, the Fe content is 80.0 at %, the Si content is 6 at %, the B content is 9.0 at %, the Zr content is 3.0 at %, the Hf content is 1.0 at %, and the Cu content is 1.0 at %; in alloy 2, the Fe content is 80.0 at %, the Si content is 6.0 at %, the B content is 9.0 at %, the Zr content is 1.0 at %, the Hf content is 3.0 at %, and the Cu content is 1.0 at %; and in alloy 3, the Fe content is 87.0 at %, the Si content is 2.0 at %, the B content is 9.0 at %, the Zr content is 0.5 at %, the Hf content is 0.5 at %, and the Cu content is 1.0 at %;

Step 1: removing the surface oxidation layers of raw materials of the alloy, cleaning the raw materials, and weighing the raw materials according to a certain mass ratio. Vacuumizing the weighed raw materials in a vacuum induction melting furnace or vacuum arc melting furnace to $8\times10^{-4}$ Pa, filling inert gas for protection, then melting the raw materials, and repeating melting for 6 times to obtain an alloy ingot;

Step 2: after vacuumizing to $4\times10^{-3}$ Pa, filling nitrogen with the purity of 99.9 vol % for protection, placing the alloy ingot below a suspended coil, and stably suspending the parent alloy in the center of a heating coil by the Lorentz force formed by the interaction between the electromagnetic field and the induced current;

Step 3: heating the alloy by induction of the heating coil to the molten state, then heating up to 1400° C., preserving heat for 10 min, and then turning off the heating electric power to make the alloy naturally cool;

Step 4: implementing a cycle process of "heating-heat preservation-solidification" for 4 times and 6 times respectively so that the alloy achieves the degrees of undercooling of about 210° C. and 270° C.;

Step 5: solidifying the undercooled and solidified alloy into strips through rapid quenching of melt;

Step 6: carrying out crystallization annealing of the obtained strips at 550° C. to obtain a Fe-based nanocrystalline alloy;

The saturation magnetization and coercive force of the alloy at different degrees of undercooling are shown in the table below:

TABLE 8

Saturation Magnetization and Coercive Force of FeSiBZrHfCu Nanocrystalline Alloy at Different Degrees of Undercooling

| Sample Number | Saturation Magnetization (T) | Coercive Force (A/m) |
|---|---|---|
| Alloy 1 (Not undercooled) | 1.55 | 15.8 |
| Alloy 1 (Undercooled at 210° C.) | 1.57 | 3.2 |
| Alloy 1 (Undercooled at 270° C.) | 1.58 | 1.5 |
| Alloy 2 (Not undercooled) | 1.56 | 223.7 |
| Alloy 2 (Undercooled at 210° C.) | 1.57 | 4.6 |
| Alloy 2 (Undercooled at 270° C.) | 1.59 | 2.1 |
| Alloy 3 (Not undercooled) | 1.70 | 286.5 |
| Alloy 3 (Undercooled at 210° C.) | 1.72 | 12.3 |
| Alloy 3 (Undercooled at 270° C.) | 1.73 | 3.5 |

Embodiment 9

Preparing FeSiBYCu Nanocrystalline Alloy by Undercooling Solidification

A FeSiBYCu system alloy is prepared, wherein in alloy 1, the Fe content is 81.0 at %, the Si content is 4.0 at %, the B content is 9.0 at %, the Y content is 5.0 at %, and the Cu content is 1.0 at %; in alloy 2, the Fe content is 84.0 at %, the Si content is 4.0 at %, the B content is 9.0 at %, the Y content is 2.0 at %, and the Cu content is 1.0 at %; and in alloy 3, the Fe content is 87.0 at %, the Si content is 2.0 at %, the B content is 9.0 at %, the Y content is 1.0 at %, and the Cu content is 1.0 at %;

Step 1: removing the surface oxidation layers of raw materials of the alloy, cleaning the raw materials, and weighing the raw materials according to a certain mass ratio. Vacuumizing the weighed raw materials in a vacuum arc melting furnace to $8\times10^{-4}$ Pa, filling inert gas for protection, then melting the raw materials, and repeating melting for 4 times to obtain an alloy ingot;

Step 2: after vacuumizing to $5\times10^{-3}$ Pa, filling argon with the purity of 99.9 vol % for protection, placing the alloy ingot below a suspended coil, and stably suspending the parent alloy in the center of a heating coil by the Lorentz force formed by the interaction between the electromagnetic field and the induced current;

Step 3: heating the alloy by induction of the heating coil to the molten state, then heating up to 1500° C., preserving heat for 3 min, and then turning off the heating electric power to make the alloy naturally cool;

Step 4: implementing a cycle process of "heating-heat preservation-solidification" for 3 times and 6 times respectively so that the alloy achieves the degrees of undercooling of about 180° C. and 255° C.;

Step 5: solidifying the undercooled and solidified alloy into strips through rapid quenching of melt;

Step 6: carrying out crystallization annealing of the obtained strips at 500° C. to obtain a Fe-based nanocrystalline alloy;

The saturation magnetization and coercive force of the alloy at different degrees of undercooling are shown in the table below:

TABLE 9

Saturation Magnetization and Coercive Force of FeSiBYCu Nanocrystalline Alloy at Different Degrees of Undercooling

| Sample Number | Saturation Magnetization (T) | Coercive Force (A/m) |
|---|---|---|
| Alloy 1 (Not undercooled) | 1.60 | 23.6 |
| Alloy 1 (Undercooled at 180° C.) | 1.65 | 16.5 |
| Alloy 1 (Undercooled at 255° C.) | 1.66 | 4.7 |
| Alloy 2 (Not undercooled) | 1.65 | 125.3 |
| Alloy 2 (Undercooled at 180° C.) | 1.70 | 18.6 |
| Alloy 2 (Undercooled at 255° C.) | 1.71 | 8.6 |
| Alloy 3 (Not undercooled) | 1.72 | 205.3 |
| Alloy 3 (Undercooled at 180° C.) | 1.75 | 20.2 |
| Alloy 3 (Undercooled at 255° C.) | 1.77 | 9.5 |

In conclusion, the present invention has the technical effects of improving the amorphous forming ability of Fe-based alloys through glass purification combined with cyclical superheating or electromagnetic levitation melting and achieving the goals of reducing the content of elements promoting amorphous formation and increasing the content of ferromagnetic elements, so as to obtain the amorphous or nanocrystalline soft magnetic alloy with large saturation magnetization and low coercive force. The principle of achieving the technical effects is as follows: during the process of glass purification combined with cyclical superheating, glass fluxing can adsorb heterogeneous nucleation points in fused alloys, and the cold and hot cycle process of superheating and heating up-heat preservation-cooling also can lead to thermal decomposition of heterogeneous nucleation points at high temperatures and cause substance exchange in the process of heat convection between the interior and the surface, effectively reducing the heterogeneous nucleation points in the alloy. During the process of electromagnetic levitation melting, the alloy can be effectively prevented from introducing impurities in the melting process through containerless melting, and the heterogeneous nucleation points in the alloy are thermally decomposed through superheating at high temperature. Both of the above methods can reduce or avoid the crystallization phenomenon and improve the amorphous forming ability. On one hand, the reduction of heterogeneous nucleation points can optimize the microstructure of the alloy, weaken the destructive effect on magnetic exchange coupling and increase the saturation magnetization of the alloy. On the other hand, the improvement of the amorphous forming ability of the alloy is conducive to the formation of a more disordered amorphous structure, which effectively eliminates the magnetocrystalline anisotropy and reduces or avoids the blocking effect of the heterogeneous nucleation points on magnetic inversion, so as to obtain low coercive force.

The invention claimed is:

1. An undercooling solidification method for preparing an amorphous or nanocrystalline soft magnetic alloy, wherein a chemical formula of the amorphous or nanocrystalline soft magnetic alloy is FeSiBM, M is one or more of P, C, Nb, Zr, Hf, Mo, Y, Cu and Co; and an alloy is undercooled and solidified by means of glass fluxing combined with cyclical superheating, comprising:

step 1: removing surface oxidation layers of raw materials of the alloy, cleaning the raw materials, weighing the raw materials according to a certain mass ratio, vacuumizing weighed raw materials in a vacuum induction melting furnace or vacuum arc melting furnace to at least $10^{-3}$ Pa, filling inert gas for protection, then melting the raw materials, and repeating melting for 4-6 times to obtain an alloy ingot;

step 2: putting the alloy ingot into a crucible, and covering upper and lower surfaces with a glass purifying agent with a certain mass ratio so that the glass purifying agent completely covers the alloy ingot;

step 3: after vacuumizing to at least $10^{-2}$ Pa, filling inert gas for protection, heating the alloy ingot to a molten state, then heating up to 1200-1500° C., preserving heat for 1-10 min to obtain a molten alloy, and turning off a heating electric power to make the molten alloy naturally cool;

step 4: implementing a cycle process of "heating-heat preservation-solidification" for 3-6 times to obtain an undercooled and solidified alloy;

step 5: solidifying the undercooled and solidified alloy into strips or powders through melt quenching or atomization;

step 6: for the strips or powders, carrying out stress-relief annealing to obtain the amorphous soft magnetic alloy or carrying out crystallization annealing to obtain the nanocrystalline soft magnetic alloy;

wherein a process for preparing the glass purifying agent comprises: weighing and placing powdered $Na_2B_4O_7$ and $B_2O_3$ with a purity of not less than 98% in a corundum crucible respectively, firing at 400-600° C. for 1-8 h, then melting and firing at 800-1000° C. for 2-16 h, and mixing fired $Na_2B_4O_7$ and $B_2O_3$ to obtain the glass purifying agent, wherein a mass ratio of $Na_2B_4O_7$ to $B_2O_3$ is 1:1-20.

2. The undercooling solidification method according to claim 1, wherein the inert gas is argon or nitrogen with a purity of not less than 99.9 vol %.

3. The undercooling solidification method according to claim 1, wherein a heat-resistance temperature of the crucible is not lower than 1400° C.

4. The undercooling solidification method according to claim 1, wherein a mass ratio of the glass purifying agent to the alloy ingot is 1:1-5.

5. The undercooling solidification method according to claim 1, wherein a total atomic percent of alloy elements is 100%, and a content of each element is as follows: Fe is 80.0-89.0 at %, Si is 1.0-9.0 at %, B is 3.0-12.0 at %, P is 0-5.0 at %, C is 0-5.0 at %, Nb is 0-3.0 at %, Zr is 0-3.0 at %, Hf is 0-3.0 at %, Mo is 0-3.0 at %, Y is 0-5.0 at %, Cu is 0-2.0 at % and Co is 0-16.0 at %.

* * * * *